July 20, 1926.

H. P. KANAKY 1,592,939

METHOD FOR THE MANUFACTURE OF ARMATURES, ROTORS, AND THE LIKE

Filed March 31, 1925    2 Sheets-Sheet 1

Inventor
Henry P. Kanaky;
By R. S. Berry
Attorney

July 20, 1926.  
H. P. KANAKY  
1,592,939  
METHOD FOR THE MANUFACTURE OF ARMATURES, ROTORS, AND THE LIKE  
Filed March 31, 1925    2 Sheets-Sheet 2
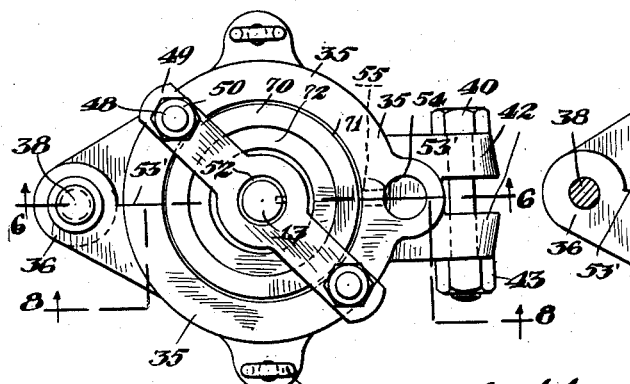
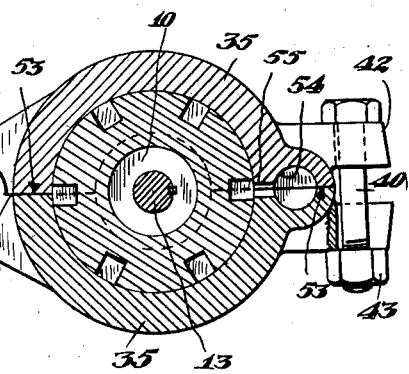
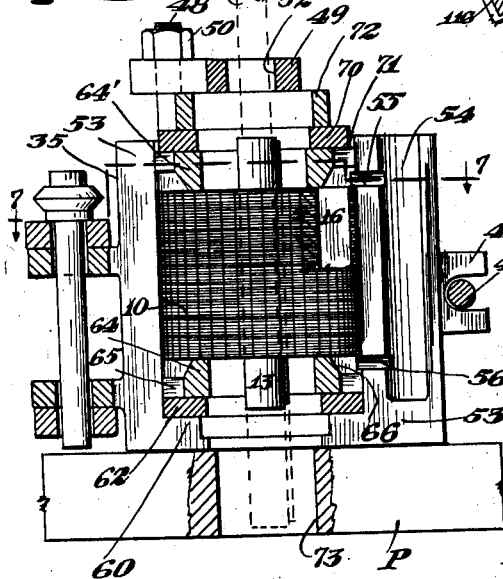
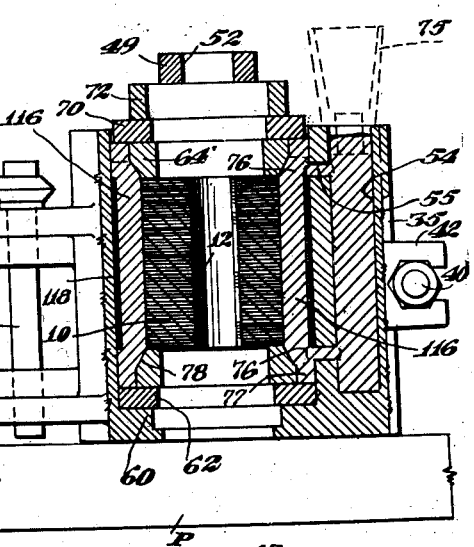
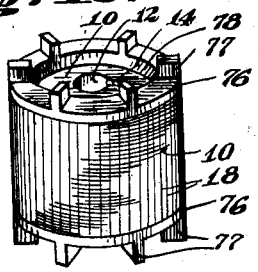
Inventor  
Henry P. Kanaky Patented July 20, 1926.

1,592,939

UNITED STATES PATENT OFFICE.

HENRY P. KANAKY, OF LOS ANGELES, CALIFORNIA, ASSIGNOR TO KAN-DOR ELECTRIC COMPANY, OF LOS ANGELES, CALIFORNIA, A COMMON-LAW TRUST.

METHOD FOR THE MANUFACTURE OF ARMATURES, ROTORS, AND THE LIKE.

Application filed March 31, 1925. Serial No. 19,671.

This invention relates to the manufacture of laminated rotary structures and more particularly to the production of armatures and rotors for electrical application.

An object of the invention is to produce a rotary device of the character stated wherein a very large percentage of the goods will be perfect, as against approximately thirty percent loss through imperfections obtained by methods used heretofore. Therefore it is also an object to reduce the cost of production.

More specifically, an object is to produce laminated armatures and the like, wherein poured metal columns bind the laminations into a unit, in which the poured metal is not placed under stress or strain, will not crack, and will not permit separation or cause other imperfections during or after cooling.

A further object is to prevent the occurrence of voids or blow holes in such structures.

Briefly, the method comprises the steps of assembling apertured metallic laminations upon a mandrel, placing the assembly in a mold, securing the laminated structure in the mold, removing the mandrel from the laminated structure while being held in the mold, preheating the mold and contained laminations to a high temperature and pouring molten metal into the heated mold while substantially stationary so that the metal works up from the bottom and displaces the air. Thus the metal is permitted to flow freely upward about the laminations to fill all grooves and spaces and to force out all air. The mold is then allowed to stand and permit the metal to cool while in a quiescent state, and inasmuch as both the mold and its contents are highly heated, the cooling step is slow. As a result a perfect structure is produced, the same when cooled being free from cracks, blow holes, separations and the like. The device is then ready for placing on the armature shaft or other shaft.

By the present method, the poured metal in the finished structure is under no internal stress or strain such as would produce any rupture, as has been the case heretofore where the metal was introduced and forced into the spaces under centrifugal force. Also removal of the mandrel before molding, instead of after molding, eliminates a serious cause of defects suffered heretofore.

With the above objects in view and others which will be apparent, the invention resides in the various steps, features and relations disclosed and described generally hereinafter, and pointed out in the claims, it being understood that said invention is limited only as defined by said claims.

In the accompanying drawings wherein steps of process are indicated, and wherein certain forms of apparatus with which the method may be carried on are disclosed;

Figure 5 is a plan view of said mold;

Figure 6 is a vertical section taken on the line 6—6 of Figure 5 showing the laminated structure and the mandrel in position;

Figure 7 is a cross section taken on the line 7—7 of Figure 6;

Figure 8 is a vertical section similar to that of Figure 6, after the mandrel has been removed and after the molten metal has been poured into the mold to fill the spaces in the laminated structure;

Figure 9 is a perspective view showing one of the end mold-plates used in the mold at the ends of said structure;

Figure 10 is a perspective view of the laminated structure per se showing the ends or hubs cast therein; and Figure 11 is a fragmentary detail indicating how the apertures and grooves of the discs are filled with metal.

Figure 1:
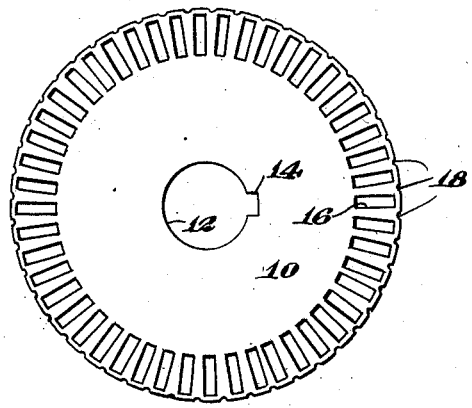
Figure 1 is a face view of one of the metallic discs comprising the laminated structure.
Figure 2:
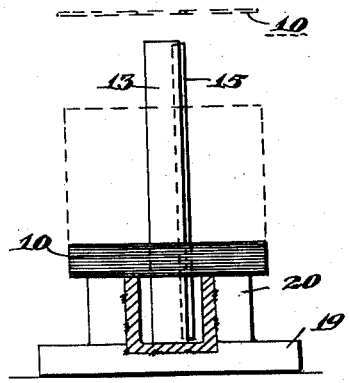
Figure 2 is chiefly an elevation, indicating the assembly of the discs upon a mandrel during construction of said laminated structure.
Figure 3:
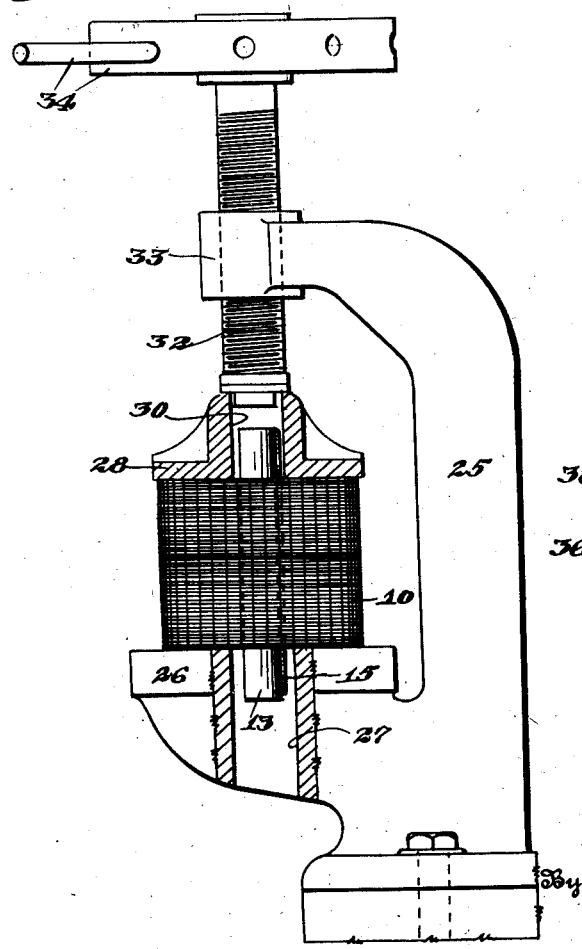
Figure 3 is chiefly an elevation, showing the laminated structure in a press whereby the discs are pressed into close relation.
Figure 4:
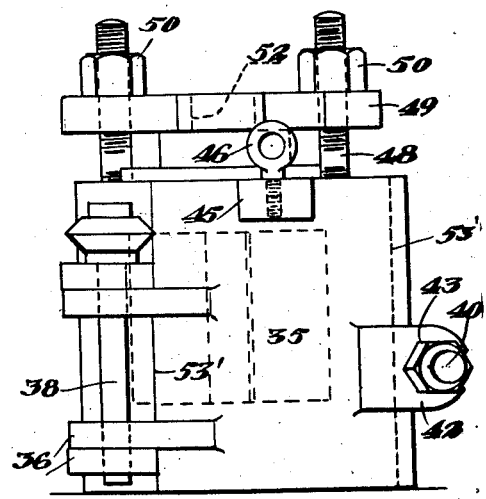
Figure 4 is an elevation of the clam shell mold into which the laminated structure is placed for removal of the mandrel and for pouring of the molten metal.

The laminated structure of the present invention is built up in a known manner from a plurality of discs 10 and provided at their centers with apertures 12 for the reception of a mandrel 13 and subsequently of an armature shaft or the like, key-ways 14 being provided for the reception of key 15 which properly aligns the discs. Each disc also is provided with a plurality of radially extending elongated openings 16 disposed near the periphery of the same, and is notched on said periphery as indicated at 18. In assembling the structure a suitable support or holder 19 which may have an annular supporting flange 20 is employed to support the mandrel 13 during the assembling operation, as indicated in Figure 2. When said discs have been assembled it is obvious that the aligned openings 16 will form corresponding longitudinally extending channels and that the aligned notches 18 will form corresponding longitudinal grooves on the surface of the laminated structure.

After assembling of the discs 10 the device is placed in a press 25 with one end thereof resting on the bed 26 and the lower end of the mandrel 13 projecting into an axially disposed passage 27. The upper end of the structure is engaged by a head 28 apertured axially at 30 to receive the upper end of the mandrel 13, said head being operated through the medium of a screw 32 extending through a threaded hub 33 and actuated by any means 34. By this mechanism the discs 10 are firmly pressed into close relation on the mandrel 13 and the structure is then ready for the mold.

A clam shell mold 35 is used for receiving the laminated assembly, this mold comprising two halves, each of which is provided with ears 36 adapted to receive a pintle 38 to form a hinge. At the side opposite from the hinge each of the mold halves is provided with a pair of jaws 42 for the reception of a headed bolt 40 having a nut 43 threaded thereon for firmly clamping the halves of the molds in operative position. Each half of the mold is provided preferably with a laterally projecting lug 45 carrying a supporting eye 46 for the purpose of receiving means by which the mold is handled, especially when hot. A threaded stud 48 projects from the upper face of each of the mold sections, a clamping bar 49 being adapted to pass over the studs 48 and to be forced into clamping position by means of nuts 50 threaded onto said studs 48. The clamping bar 49 is provided with a centrally disposed opening 52 for the passage of a mandrel-removing instrument, as hereinafter described. The parts of the mold are closed with their abutting faces 53 engaging along the line 53' and in said faces 53 at the side of the mold adjacent clamping means 40, 42 a well 54 is provided which extends downwardly from the top of the mold toward the bottom, and laterally extending upper and lower ducts 55 and 56 lead into the chamber which receives the laminated assembly, one half of the well and each of the ducts 55 and 56 being thus carried in each of the halves of the mold 35.

The combined bottom wall of the sections of the mold is provided with an axially disposed opening and with an annular shoulder 60 on which there rests a closure ring 62 which also serves for properly spacing the lower mold plate 64 which rests upon said ring 62. The plate 64 is notched radially as indicated at 65 and is provided with an inner, upstanding, annular flange having an outwardly directed beveled face 66. The laminated asembly 10 is adapted to rest upon the upper annular face 67 of the mold plate 64, while a second mold 64' identical in construction with the plate 64 is placed upon the top of the laminated device 10 in inverted position with respect to the position of the plate 64. An upper closure ring 70 rests upon the upper mold plate 64' and is engaged by an equalizing or pressure-distributing ring 72 which, in turn, is engaged by the clamp bar 49 carried on the threaded studs 48 and held by the nuts 50. When the parts are assembled, as indicated in Figure 6, the mandrel 13 is aligned with the opening 52 in the clamp bar 49 and with the opening in the bottom of the mold. The mold is then adapted to be placed in a press P having an opening 73 whereby a tool 74 may be forced through the opening 52 against the mandrel 13 to force the latter out of the laminated structure 10 and through the opening 73. This leaves the structure 10 firmly clamped in the mold between the mold plates 64 and 64' and in condition to receive the molten metal.

The mold and its contents are placed in a retort and heated to a high temperature, which may in practice, be nearly a white heat. The mold is then removed from the retort as by engagement of a tool with the eyes 46 and set on a bench, and a funnel 75 is placed in position for pouring of molten metal or metal alloy into the well 54, the radially extending ducts 55 and 56 being so disposed as to permit passage of the molten metal into the annular channels around the mold plates 64 and 64'. Inasmuch as the mold and the structure 10 are heated, the molten metal flows freely, the mold being stationary during the pouring operation. Said metal falls into the bottom of the well and passes by way of lower duct 56 into the annular channel around the plate 64 and into the notches 65, thence up through the openings 16 in the discs 10 and up through the grooves 18 in the edges of said discs, thereby forcing out all of the air and entering all spaces. When the level of the metal reaches the duct 55 the metal will enter through said duct 55 also and assist in complete distribution of the molten metal into all of the cavities insuring complete removal of the air; the air pocketed in the notches 65 of the upper mold plate 64' being vented through a small annular space 71 around the periphery of the upper closure plate 70. Thus the poured metal entering the laminated structure will form longitudinally extending bars 116 which fill the openings 16 and serve to tie the laminations together, while the longitudinal grooves 18 will be filled at least partially with metal, as indicated at 118 and each end of the laminated structure will have a hub 76 cast thereon, said hub being provided with upwardly extending lugs 77 and having an inner, annular, beveled face 78, as best seen in Figure 10.

The mold and is contents are allowed to stand and cool and in view of the fact that these were preheated, the cooling operation will be slow. As a result the poured metal will be allowed to set under normal conditions of repose, so that no internal stresses or strains will be set up during cooling thereby eliminating all tendency to check, crack or separate. After the parts have cooled, the halves of the mold are opened and the structure is removed, the metal within the well 54 and the ducts 55 and 56 being readily removed at the same time. The structure with its cast hub, as indicated in Figure 10, is then ready to be dressed as required.

With this method, practically all of the devices manufactured are perfect, so that the elimination of loss heretofore entailed by defects in manufacture materially reduces the cost of production.

Attention is called to the fact that not only does preheating go a long way toward perfection, but also removal of the mandrel from the laminated structure prior to the molding operation eliminates formation of lines of rupture incident to the removal of the mandrel after the molding step, as has been the prior practice.

In the claims, it is desired to have it understood that the term "rotor" is intended to include any form of armature, rotor or other laminated rotary structure.

I claim:—

1. A method for producing an armature comprising assembling a plurality of laminations on a mandrel, placing the mandrel and assembly in a mold, securing the assembly in the mold, removing the mandrel from the secured assembly, heating the mold and contained assembly, and pouring molten metal into the mold to fill spaces provided.

2. A method for producing an armature comprising assembling a plurality of laminations on a mandrel, placing the mandrel and assembly in a mold, securing the assembly in the mold, removing the mandrel from the secured assembly, heating the mold and contained assembly, pouring molten metal into the mold to fill spaces provided, and allowing the whole to stand and cool slowly.

3. In a method for producing a laminated rotor wherein the laminated structure is assembled on a mandrel and metal is subsequently cast on the structure, the step of removing the mandrel from the structure before the casting operation.

4. A method for producing a laminated rotor comprising assembling a laminated structure on a mandrel, securing the assembly in a mold, removing the mandrel from the secured assembly, and then pouring molten material into the mold.

5. A method for producing a laminated structure comprising assembling laminations upon a mandrel, securing the assembly in a mold, forcing the mandrel from the secured assembly, and pouring molten metal into the mold so that said metal passes first to the bottom of the assembly and thence upward around the same, whereby all air is forced out in advance of the molten metal.

HENRY P. KANAKY.